Oct. 7, 1947.  V. W. BREITENSTEIN  2,428,546
REVOLVING JOINT
Filed Oct. 19, 1942  2 Sheets-Sheet 1

Inventor:
Victor W. Breitenstein,
By Chritton, Wiles, Davis, Hirsch,
Schroeder & Merriam, Attys.

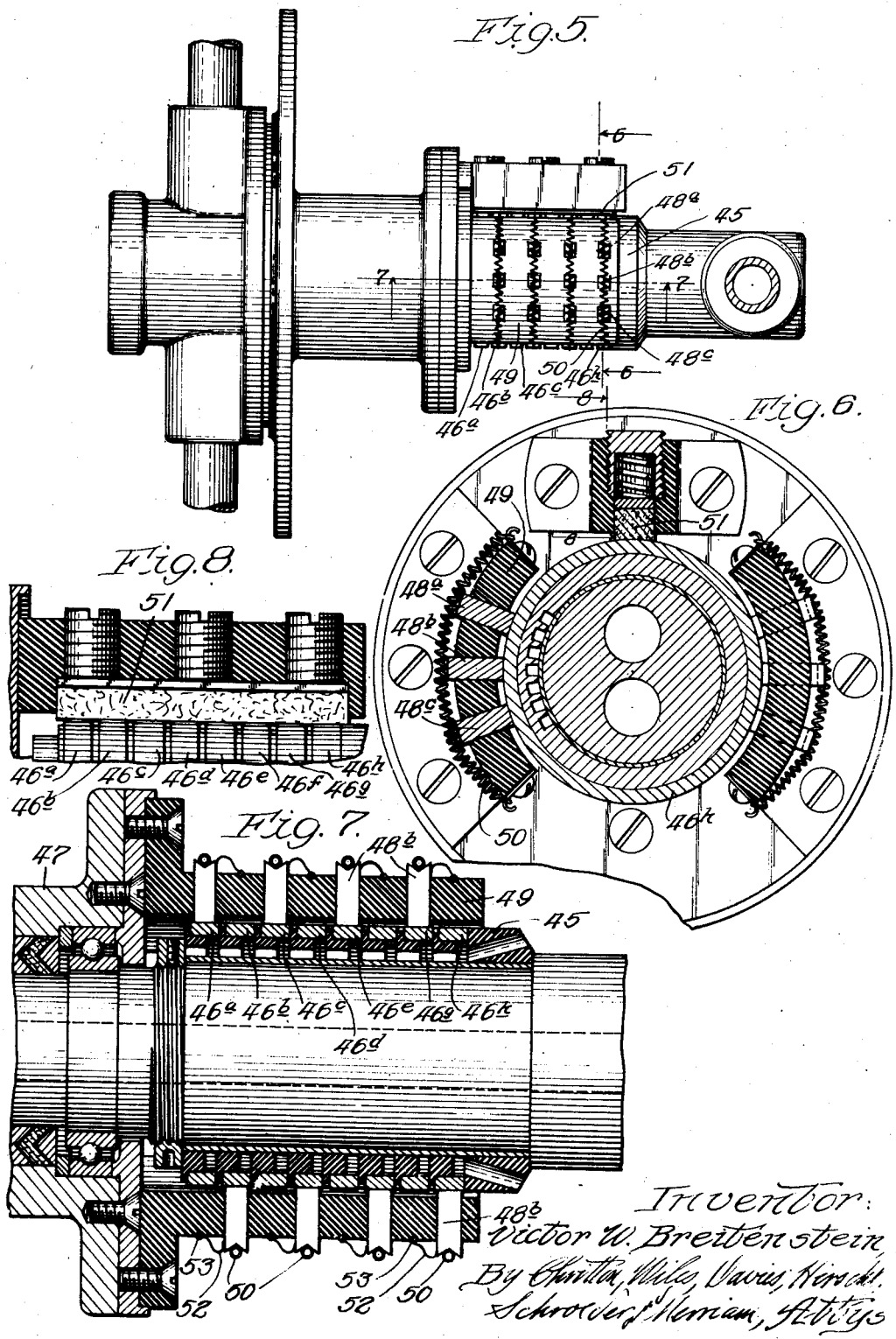

Patented Oct. 7, 1947

2,428,546

UNITED STATES PATENT OFFICE 2,428,546

REVOLVING JOINT

Victor W. Breitenstein, Chicago, Ill., assignor to Francis N. Bard, Highland Park, Ill.

Application October 19, 1942, Serial No. 462,505

5 Claims. (Cl. 174—21)

This invention relates to a revolving joint, and more particularly to an electrically conductive joint.

Figure 1:
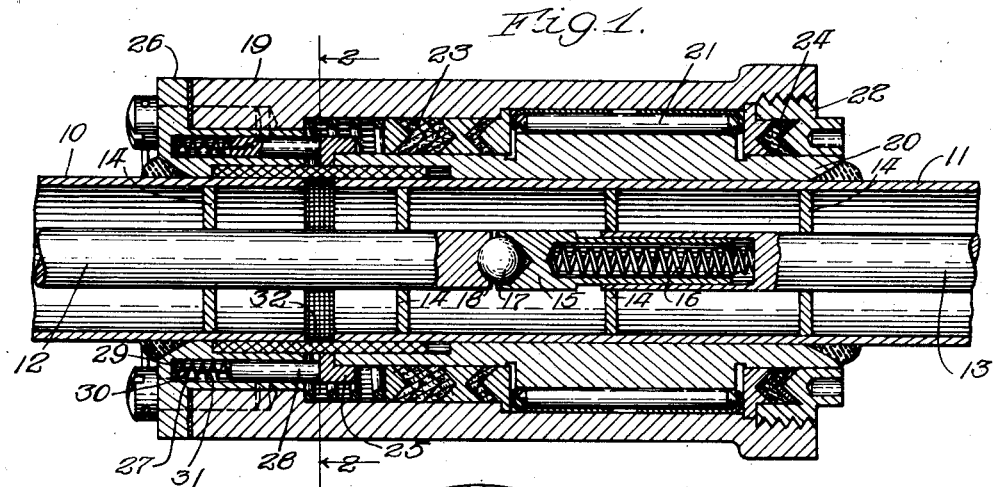
Figure 2:
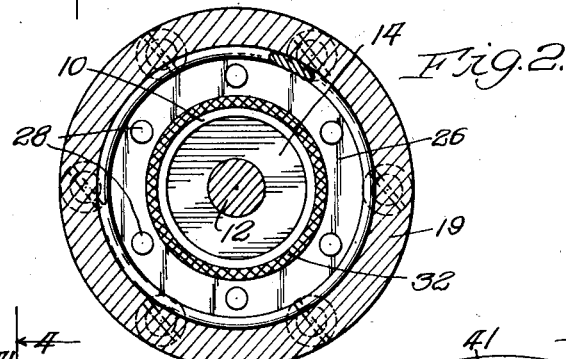
Figure 3:
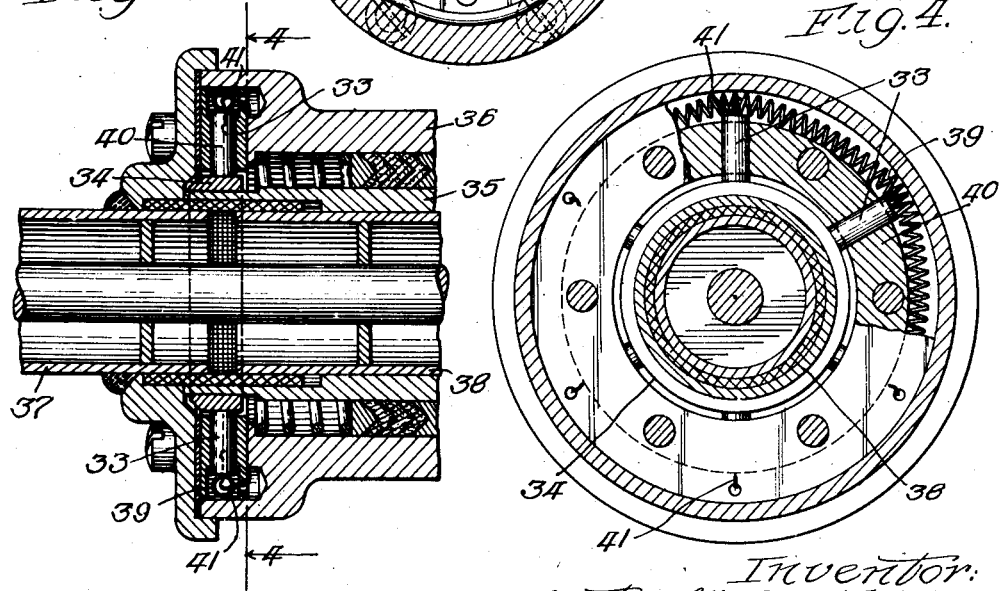
Figure 4:
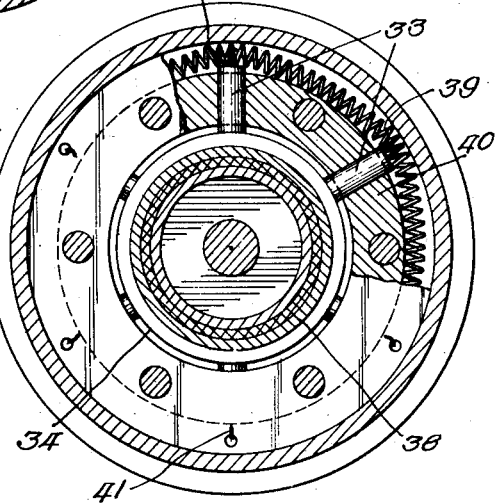

One feature of this invention is that it provides an improved fluid tight electrically conductive revolving joint for a co-axial cable; another feature of this invention is that it provides a revolving electrically conductive joint with greatly improved resistance to wear and relatively low electrical resistance; still another feature is the provision of a ball and socket connection between the portions of the center conductor; yet another feature of this invention is the provision of brush arrangements within a minimum of space; a further feature is the provision of means limiting the movement of the brushes when the parts are disassembled, so that the brush carrying portion can be removed for inspection without loss or disassembly of the brushes; still a further feature of this invention is the use of a single spring to urge a plurality of brushes in a desired direction; yet a further feature of this invention is the use of a plurality of brush and spring assembly arrangements in less than a semi-circle to provide a multiplicity of revolving circuit connections in a minimum of space; other features and advantages of this invention will be apparent from the following specification and the drawings, in which:

Figure 1 is a vertical sectional view of a revolving joint for a co-axial cable; Figure 2 is a transverse sectional view along the line 2—2 of Figure 1; Figure 3 is a fragmentary sectional view showing another brush arrangement; Figure 4 is a transverse view along the line 4—4 of Figure 3, partly broken away; Figure 5 is an elevational view of another form of a fluid and electrically conductive joint; Figure 6 is a transverse view, principally in section, along the line 6—6 of Figure 5; Figure 7 is a longitudinal sectional view along the line 7—7 of Figure 5; and Figure 8 is a fragmentary sectional detail view along the line 8—8 of Figure 6.

There are certain applications which require a revolving or swivel joint which is both fluid and electrically conductive, and it is to such joints that the present application is primarily directed, although certain subcombination features disclosed herein are useful in any type of electrically conductive revolving joint.

In the particular embodiment of this invention illustrated in Figures 1-4, a joint is shown which is particularly designed to enable relative rotational movement between two parts of a co-axial cable, the relatively movable parts of the joint maintaining fluid tight and electrically conductive contact with each other. In certain types of radio devices it is desirable to revolve the device while providing a high frequency circuit to it by a co-axial cable, the joint disclosed here being designed for such use at rotational speeds up to about a thousand revolutions per minute.

Referring now more particularly to Figures 1 and 2, the outer sheath of the cable is here shown as comprising separate parts 10 and 11, the inner or central conductor being shown as comprising the rod members 12 and 13 preferably located within the casing and held in center position by spacing washers 14, which may be of ceramic or other suitable material. The rod member 13 is here shown as having an end portion 15 telescopically mounted for movement along the axis of the cable, a spring 16 urging this portion toward the end of the other rod member 12. This end portion 15 has a ball 17 mounted therein, the ball providing a convex portion adapted to be received by a concavity 18 in the end or face of the rod member 12. The concavity has the same radius of curvature as the ball 17, so that the cooperating portions are segments of a sphere of the same radius so that a substantial contact area is provided while limited universal movement between the parts may take place. While the rod or conductor members 12 and 13 are of copper, the ball 17 is preferably of steel and the face having the cooperating concavity is preferably hardened to secure good wearing characteristics.

Each of the two sheath portions 10 and 11 is permanently connected, as by welding, to one of the two parts 19 and 20 of the joint casing. Each of these parts is generally cylindrical in shape, needle bearings 21 facilitating rotation between them. After the part 20 has been slipped into the part 19 the cap 22 is screwed in place, so that the parts are mechanically locked together in a way which enables relative rotation between them about the axis of the cable. Suitable gaskets or packing members, here identified as 23 and 24, provide a fluid tight seal during such relative movement between the parts. This is necessary, since cables of the type here disclosed are generally filled with an inert gas at a pressure of five or ten pounds to the square inch or thereabouts. Accordingly, there must not only be electrical connection from sheath to sheath and from central conductor to central conductor, but also a continuance of the passageway and a maintenance of the fluid pressure in the cable during the desired rotation.

The casing portion 20 carries a rubbing ring 25 which may be of bronze or other suitable material, and which has its rubbing face concentric with the cable axis and in a plane perpendicular thereto. The other part 19 of the joint casing is provided with a plurality of contact units adapted to make rubbing engagement with the ring 25, these being shown as carried by the cap 26 and bolted or otherwise removably fastened to the casing part 19. A plurality of openings 27 are drilled in the cap, equally spaced around the cable axis and parallel thereto, and each of these is adapted to receive a contact unit comprising a brush 28, a holding member or washer 29, a flexible connection 30 between these parts, and a coil spring 31. It will be seen that the washer 29 is spaced from one end of the brush 28 and fastened thereto by the connecting means 30, which may be a piece of flexible wire, the spring 31 urging these parts apart to the extent of the length of the flexible connection 30, so that this connection provides a limit upon the extent to which the spring can move the brush. As may be seen in Figure 1, the connection wire 30 is slack when the brush is in engagement with the rubbing ring 25; but if the cap is removed for inspection, the brushes are prevented from jumping out of the openings in the cap by the limiting means described above, so that a unit is provided which may be removed and easily handled without loss or disassembly of the contact parts. The washer 29 should preferably be a fairly tight but not a binding fit in the opening 27, so that the whole contact unit can be pulled out and replaced when necessary. By having the brush openings parallel to the axis of the cable fairly long brushes and coil springs can be used, with good mechanical characteristics, without unduly increasing the external diameter of the joint. The brushes may be of any conventional material, preferably being carbon-metal, as carbon copper. Such brushes are hard enough to withstand the wear imposed by rotation at speeds approaching a thousand revolutions per minute, yet give reasonably low contact resistance. The joint disclosed here, for example, has a contact resistance between its parts less than one-fourth of any previous similar joint using brushes to complete the electrical circuit. A dust shield 32, of fiber or similar material, prevents carbon or metal particles from getting into the cable.

In the modified form of joint shown in Figures 3 and 4 the brushes 33 are mounted for radial movement, and cooperate with the outer surface of a rubbing ring 34. As before, the rubbing ring is carried by a casing part 35 rotatably connected to the other casing part 36, this latter part carrying the brushes, each part being permanently fastened to one of the sheath parts 37 and 38. Previous attempts to arrange the brushes radially have had certain disadvantages, primarily in that the brushes were either made so short that they had a tendency to "cock" or stick in their openings, or in that the external diameter of the joint had to be unduly large if this was to be avoided. Space can be a serious limitation, as for example in aircraft radio equipment, and a reduction in the external diameter of the joint is exceedingly important under such circumstances. Such reduction has been obtained here, while maintaining a reasonable brush length, but using a single coil spring 39 for urging a plurality of the brushes 33 toward the rubbing ring. Instead of a single coil spring co-axial with each brush, this coil spring 39 is arranged in an arc about the center of the cable, with its axis transverse to that of the brushes at its point of contact. The end of the brushes in contact with the spring is preferably notched slightly to receive a portion of the spring and maintain the parts in desired relationship. With the arrangement shown in Figures 3 and 4 the action of the spring in moving the brushes in is again limited, this time by engagement of the spring with the surface of the annular portion 40 carrying the brushes. In order to insure good electrical connection between the brushes and the casing individual pigtails 41 are used.

Another embodiment of this radial arrangement of brushes is shown in Figures 5-8 in combination with a two passage fluid joint. This form of joint is not designed for use with a coaxial cable, but as part of a machine gun mount in a turret, for example. The details of the fluid joint, as such, will not be described as they form the subject matter of the co-pending Bard et al. application No. 441,074, filed April 30, 1942, which issued as Patent No. 2,343,491 on March 7, 1944. It is sufficient to point out that this joint provides two completely separate fluid flow paths between its ends, yet permits swiveling or relative rotation between the parts.

It is sometimes necessary to carry a number of circuit paths as well as a plurality of fluid flow paths to the device associated with such a joint, as a machine gun, and the electrical arrangement shown here is particularly advantageous for such a purpose. One of the joint parts 45 carries a plurality of contact rings 46a—h, adapted to be connected to wires forming parts of said circuit paths, while the other joint part 47 carries a plurality of contact arrangements, as may be best seen in Figures 6 and 7. Each of these contact arrangements is here shown as comprising three brushes, as 48a, 48b and 48c, these being radially movable in openings in an insulating block 49 and having their inner surfaces in engagement with the rubbing ring 46h. A single coil spring 50 is arranged on an arc around the axis of the joint, the ends of the brushes being notched to at least partly receive it, this single spring acting to urge all of the brushes into operating contact engagement with the ring. As before, the diameter rather than lengths of the coil spring extends radially from the joint, so that relatively long brushes may be used without excessive increase in external joint diameter. By making each of the contact assemblies less than a semi-circle, as may be best seen in Figure 6, they can be arranged on alternating sides of the joint and cooperate with rubbing rings running entirely around the joint, so that a large number of circuit paths may be completed within a small space. A spring pressed rubbing or wiping block 51 is adapted to keep the contact rings clean; and pigtails and wires, as 52 and 53, are used to insure good circuit continuity.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A revolving fluid and electrically conductive joint capable of uniformly transferring current during rotation at high speeds of revolution, including: a first generally cylindrical casing part; a second generally cylindrical casing part, one of the two parts having a readily removable cap portion for mechanically connecting the parts for relative rotation about the axis of the casing and a fluid passageway being provided therethrough, means providing a fluid tight seal between said parts; a metal ring mounted in the second of said parts concentric with said axis and in a plane perpendicular thereto; a plurality of brushes movably mounted in openings in the cap portion and adapted to make rubbing engagement with the ring; spring means bearing against the brushes to urge them toward the ring; and means limiting the action of the spring means, whereby the brushes remain in the openings when the parts are separated.

2. Apparatus of the character claimed in claim 1, wherein each brush has a separate coil spring associated therewith and the limiting means comprises a flexible connection between each brush and the end of the associated spring remote therefrom.

3. In combination with two relatively rotatable parts of a coaxial cable, each part comprising inner and outer concentric conductors spaced by insulating members and having insulating fluid therebetween, a revolving electrically conductive joint capable of uniformly transferring current during rotation at high speeds of revolution, including: a generally cylindrical casing comprising two parts mechanically connected for relative rotation about the axis of the casing, each being adapted to be connected to an outer conductor of said cable parts; means providing a fluid tight seal between said parts; a metal ring on one of said parts concentric with said axis and in a plane perpendicular thereto; a plurality of brushes movably mounted in openings in the other part and adapted to make rubbing engagement with the ring; spring means bearing against the brushes to urge them toward the ring; two central conductor members lying along said axis, each being carried by and movable with but electrically insulated from the casing parts, one of said members having an axially movable end portion adjacent the end portion of the other member, one of said end portions being provided with a concavity and the other with a cooperating convex portion; and spring means for urging an end portion into engagement with the other.

4. A revolving electrically conductive joint capable of uniformly transferring current during rotation at high speeds of revolution, including: a first generally cylindrical casing part; a second generally cylindrical casing part, one of the two parts having a readily removable portion for mechanically connecting the parts for relative rotation about the axis of the casing and a fluid passageway being provided therethrough; means providing a fluid tight seal between said parts; a metal ring mounted in the second of said parts concentric with said axis and in a plane perpendicular thereto; a plurality of brushes movably mounted in openings in said removable portion and adapted to make rubbing engagement with the ring; spring means bearing against the brushes to urge them toward the ring; means limiting the action of the spring means, whereby the brushes remain in the openings when the parts are separated; two central conductor members lying along said axis, each being carried by and movable with one of the casing parts, one of said members having an axially movable end portion adjacent the end portion of the other member, one of said end portions being provided with a concavity and the other with a cooperating convex portion; and spring means for urging said end portions into engagement with each other.

5. A revolving electrically conductive joint capable of uniformly transferring current during rotation at high speeds of revolution, including: a first generally cylindrical casing part; a second generally cylindrical casing part, one of the two parts having a readily removable portion for mechanically connecting the parts for relative rotation about the axis of the casing and a fluid passageway being provided therethrough; means providing a fluid tight seal between said parts; a metal ring mounted in the second of said parts concentric with said axis and in a plane perpendicular thereto; a plurality of brushes movably mounted in openings in said removable portion and adapted to make rubbing engagement with the ring; spring means bearing against the brushes to urge them toward the ring; means limiting the action of the spring means, whereby the brushes remain in the openings when the parts are separated; two central conductor members lying along said axis, each being carried by and movable with one of the casing parts, one of said members comprising telescoping parts providing an axially movable end portion adjacent the end portion of the other member, one of said telescoping parts being hollow and one of said end portions being provided with a concavity and the other with a cooperating convex portion; and a helical spring in said hollow telescoping part for urging said end portions into engagement with each other.

VICTOR W. BREITENSTEIN.

REFERENCES CITED

The following references are of record in the file of this patent:

UNITED STATES PATENTS

| Number | Name | Date |
| --- | --- | --- |
| 2,291,070 | Bruno | July 28, 1942 |
| 1,176,554 | Herzig | Mar. 21, 1916 |
| 2,345,019 | Van Alstyne | Mar. 28, 1944 |
| 1,821,132 | Baker | Sept. 1, 1931 |
| 2,332,529 | Reppert | Oct. 26, 1943 |
| 2,264,998 | Miner | Dec. 2, 1941 |

FOREIGN PATENTS

| Number | Country | Date |
| --- | --- | --- |
| 355,862 | Great Britain | Sept. 3, 1931 |
| 642,129 | France | May 2, 1938 |